STANLEY J. GUT
INVENTOR.

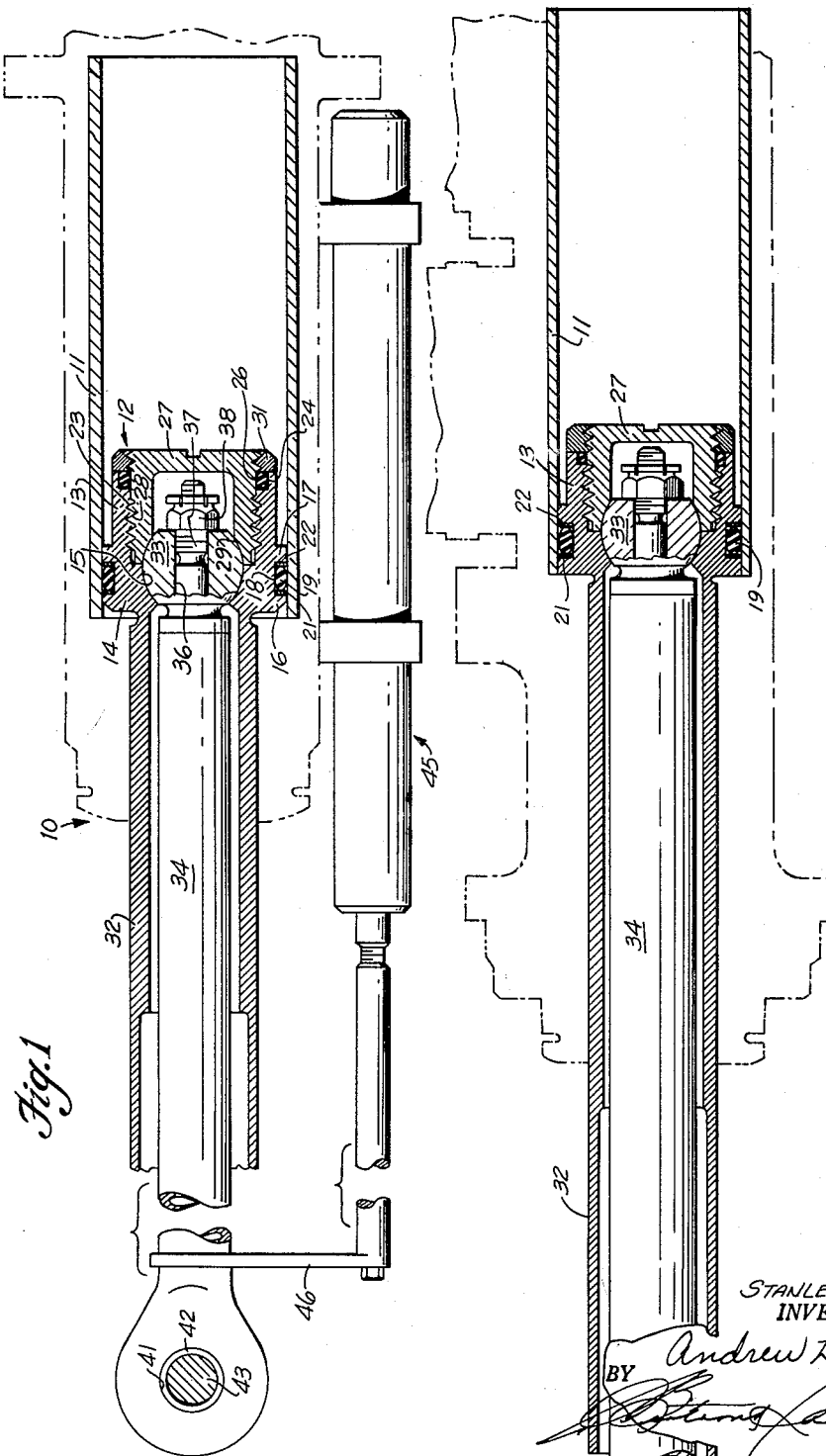

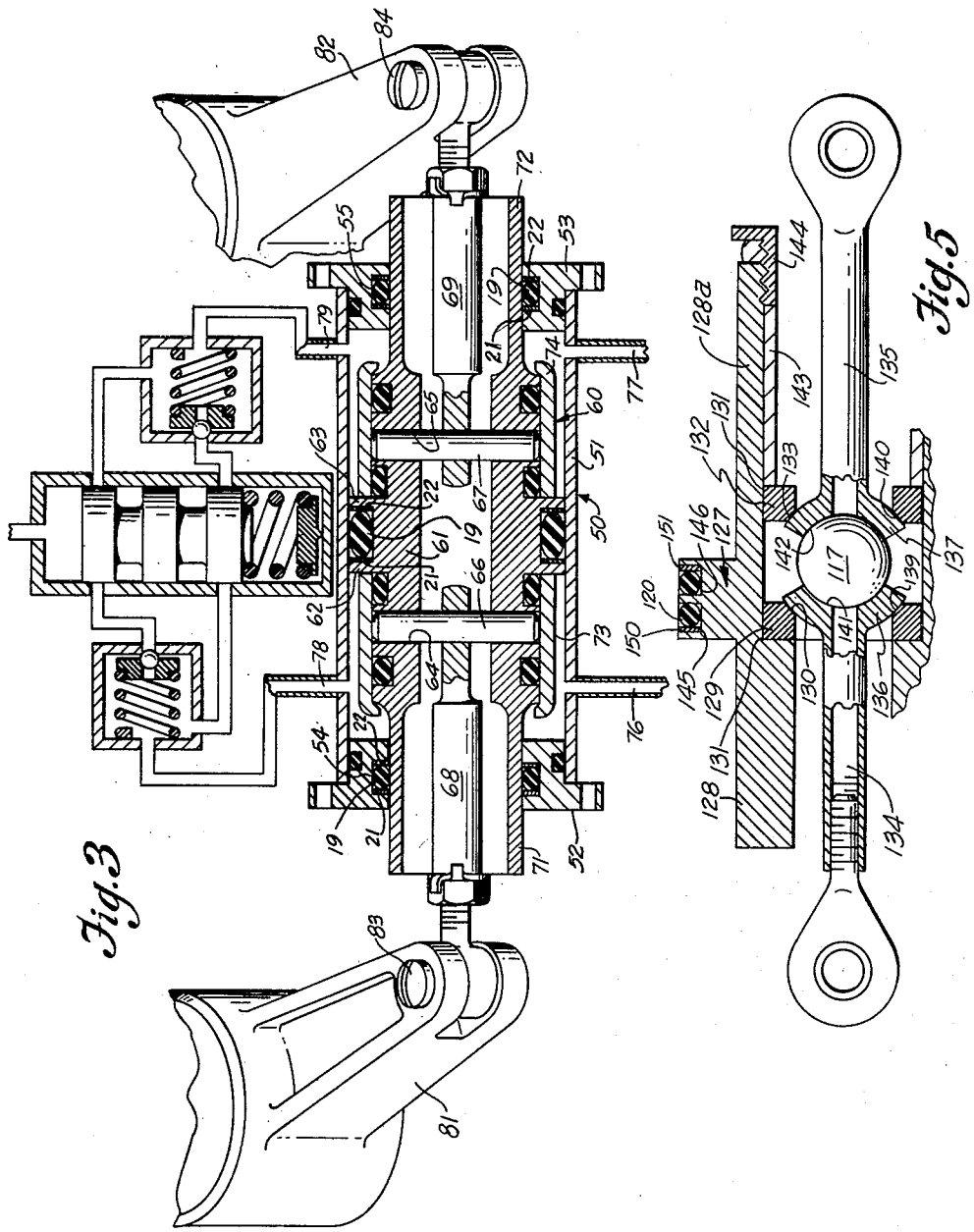

BY *Andrew L. Bain*

ATTORNEYS

Dec. 29, 1964 S. J. GUT 3,163,093
HYDRAULIC ACTUATOR FITTED WITH PIVOTED JOINT
Filed Sept. 19, 1960 4 Sheets-Sheet 4
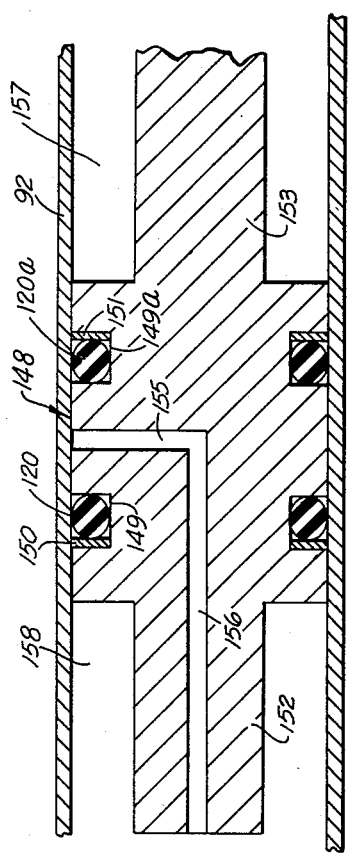
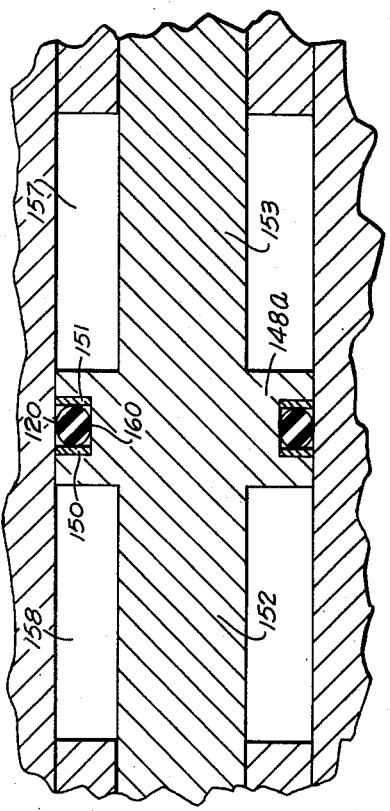
STANLEY J. GUT
INVENTOR.
BY Andrew L Bain
ATTORNEYS

United States Patent Office 3,163,093
Patented Dec. 29, 1964

3,163,093
HYDRAULIC ACTUATOR FITTED WITH PIVOTED JOINT
Stanley J. Gut, Wayne, N.J., assignor to General Precision Inc., Little Falls, N.J., a corporation of Delaware
Filed Sept. 19, 1960, Ser. No. 56,890
2 Claims. (Cl. 92—113)

The present invention relates to a hydraulic actuator, and more particularly to a hydraulic actuator in which a thrust link is journaled to a piston of the actuator, and in which one or more inserts are provided in a groove holding an O-ring of ordinary construction.

Where hydraulic actuators have been used in order to impart an angular motion to a member driven by the actuator, the actuator has been pivotally mounted. In an exemplary situation, hydraulic cylinders or actuators have had their piston rods connected with a link or crank that was in turn connected with a shaft to rotate the shaft or was connected with, for example, a fin or other control member to cause rotation of the fin or other control member. This latter example is the case where the fin or other control member is a part of an aircraft or missile.

The above described construction has been found to be deficient because of the fact that with the pivotal mounting of the hydraulic cylinder or actuator, the fluid supply lines connected with the actuator were necessarily flexible. While there has been much improvement, over the years, in the manufacture of these flexible fluid supply lines, still they have not proven entirely satisfactory.

In addition to the inherent undesirability of flexible fluid supply lines, certain hydraulic actuators have a mechanical valve mounted directly on the actuator, and in order to control the valve, it is necessary to provide flexible linkage to the valve, since the hydraulic cylinder, as a whole, is pivotally mounted. This flexible linkage has made complex the problem of controlling the valve, and the actuator which it in turn controls.

From the standpoint of the actuator itself, and its service life, the pivotal mounting of the actuator causes a side loading of the bearings, thus resulting in a shortened bearing life.

In hydraulic actuators and other fluid devices, it is common to use an O-ring as a seal between a male or piston member and a female or cylinder member. The O-ring is of resilient material and is placed in a groove in, say, the piston member, being compressed in the groove by the cooperating (cylinder) member. This construction permits a certain amount of longitudinal movement of the O-ring, and in hydraulic actuators has been found to reduce to some extent the response of the actuator. It will be appreciated that, in some applications, e.g., the adjustment of missile controls, high-resolution radar antennae, etc., the back-lash or lost motion in a hydraulic actuator must be practically nil.

There has also been a tendency for a portion of the outer portion of the O-ring to be pressed or extruded into the annular area between the inner surface of the cylinder and the piston.

An object of the present invention is to provide a fluid actuator that may be rigidly mounted.

Another object of the present invention is the provision of a fluid actuator that does not require flexible fluid lines.

Yet another object of the present invention is to provide a fluid actuator that will obviate the need for flexible control linkages to a self-mounted control valve.

A still further object of the present invention is the provision of a fluid actuator in which the bearings are not subjected to side loads.

Another object of the present invention is to provide an improved O-ring type seal construction, particularly such a construction for hydraulic actuators which will restrict the longitudinal movement of the O-ring to thereby improve the response of the actuator and also provide a more positive seal between the O-ring and the cylinder, and prevent extrusion of the O-ring into the annular area between the piston and the cylinder.

Other objects and the nature and advantages of the instant invention will be apparent from the following description taken in conjunction with the accompanying drawings, wherein:

FIGURE 1 is a longitudinal-sectional view through a hydraulic actuator in accordance with the present invention.

FIGURE 2 is a longitudinal-sectional view through the actuator of FIGURE 1, and taken at right angles to the view of FIGURE 1.

FIGURE 3 is a combined longitudinal-sectional and perspective view of another embodiment of a hydraulic actuator in accordance with the present invention.

FIGURE 5 is a schematic longitudinal-section through a modification of the actuator shown in FIGURE 1, showing a modification of the ball support means.

FIGURE 6 is a schematic longitudinal-section, similar to FIGURE 7, through another modification of the actuator, in which a single O-ring is employed to seal the piston.

FIGURE 7 is a schematic longitudinal-section through a modification of the hydraulic actuator, shown in FIGURE 4, in which the piston is sealed by a plurality of O-rings.

Figure 4:
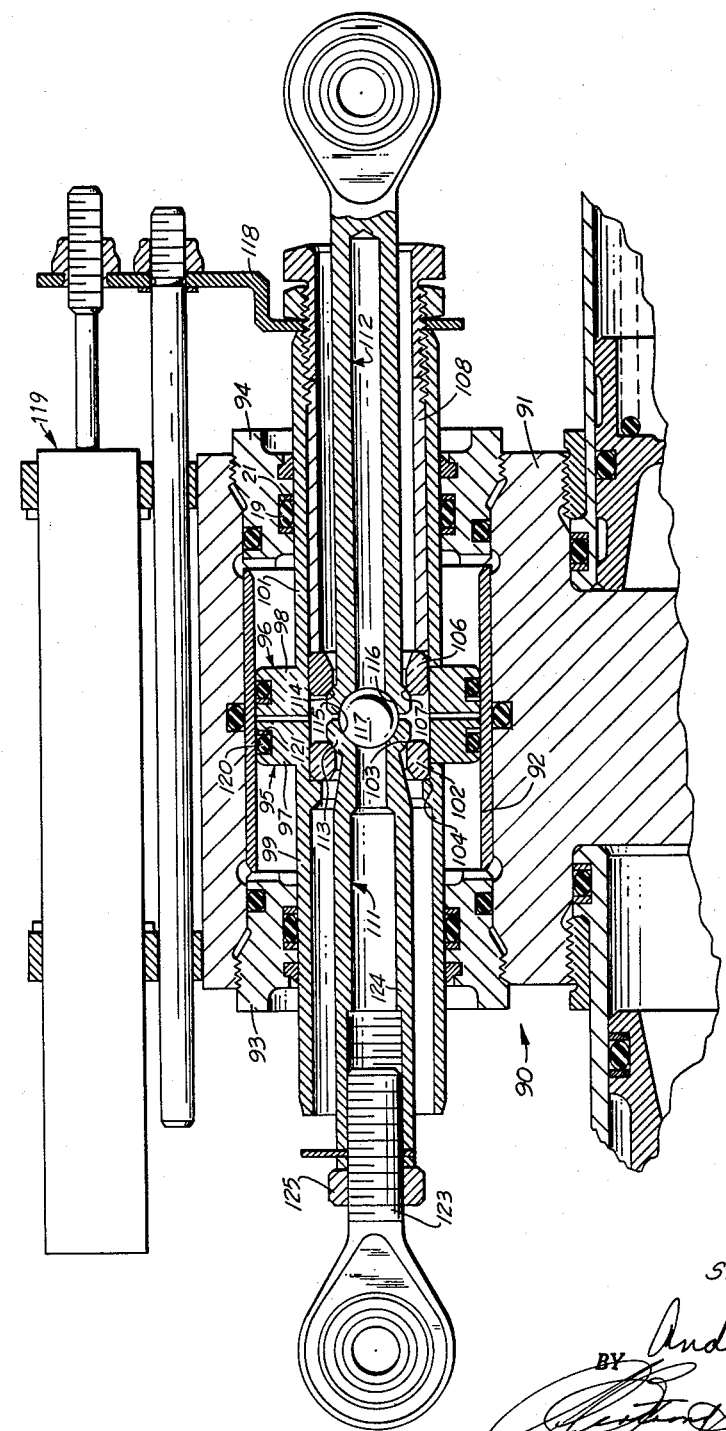
FIGURE 4 is a longitudinal-sectional view through still another embodiment of a hydraulic actuator in accordance with the present invention.

Referring now to the drawings, wherein like or corresponding reference characters are used to indicate like or corresponding parts throughout the several views, there is shown in FIGURES 1 and 2 a *fixedly mounted* hydraulic actuator generally designated 10. Hydraulic actuator 10 has a cylinder liner 11 therein, and within the cylinder liner 11 is a piston generally designated 12. Piston 12 comprises a piston head 13 which is generally hollow and has an internal flange 14 that is provided with a spherical seat 15. A pair of outwardly extending shoulders 16 and 17 provide a groove 18 between them, and in the groove 18 is an O-ring 19 of resilient material, such as a rubber-like material. Also in the groove 18 are a pair of back-up or anti-extrusion rings 21 and 22, these anti-extrusion rings each being a thin flat annular ring placed between the O-ring and the adjacent side wall of the groove 18, defined by the shoulders 16 and 17, respectively.

Piston head 13 is internally threaded at 23, and has an internal groove 24 adjacent its end, in which is an O-ring 26. An end cap 27 having external threads 28 fitted to the internally threaded piston head 13, is secured in piston head 13, and has at the inner end thereof a spherical seat 29, the cross-sectional contour of which is substantially the same as that of the spherical segmental seat 15. A locking nut 31 is threaded on the end cap 27.

A hollow piston rod 32 is integral with or fixedly attached to the internal flange 14 of the piston and the piston head 13, and extends outwardly of the housing of the actuator 10.

A spherical bearing 33 is in engagement with the spherical seats 15 and 29 and has secured thereto a thrust member 34; in the illustrated embodiment, the spherical bearing 33 has an axial bore 36 through which extends a threaded extension 37 of thrust link 34 which has thereon a suitable nut 38.

At its outer end, the thrust link 34 has an opening 41 therethrough, which receives a bearing 42 in which is journaled a pivot pin 43 of a driven member (not shown).

A position transducer generally indicated by the numeral 45 may be secured to the housing of the hydraulic actuator 10, and may have a connecting member 46 secured to the thrust link 34.

In operation, upon the admission of fluid under pressure to the right-hand end of the cylinder of the hydraulic actuator 10, the piston assembly 12 will be caused to move longitudinally in the cylinder liner 11. As will be understood, the piston rod 32 will move to the left therewith, as will the thrust link 34 and the spherical bearing 33. Where the pin 43 is mounted for rotation about an axis external to its own axis, this movement will be permitted readily by the spherical bearing 33 moving angularly on the spherical seats 15 and 29, and during this movement it will be understood that the axis of thrust link 34 will diverge relative to the axis of piston rod 32 and piston head 13, these axes, of course, intersecting at all times at the center of spherical bearing 33 and spherical seats 15 and 29. The housing of hydraulic actuator 10, including cylinder liner 11, is relatively fixed, position transducer 45 being positively located in one plane, although free to move longitudinally. Position transducer 45 will function in the known way to provide an indication of the position of the member driven by the actuator 10.

Due to the anti-extrusion rings 21 and 22, any tendency of O-ring 19 to move longitudinally upon a variation in pressure in the cylinder of hydraulic actuator will be largely restricted or reduced, and therefore the response of the actuator 10 will closely approach the theoretical for such devices, i.e., back-lash will be of negligible magnitude. For example, one commercial form of the device used in a high resolution radar system meets specifications setting a maximum value of 0.0002 inch for the aggregate of hydraulic and mechanical lost motion.

These back-up or anti-extrusion rings also sharply reduce the tendency for the O-ring to be pressed or extruded into the annular area between the cylinder wall and the piston, thereby reducing fluid blow by through this area to a minimum.

In FIGURE 3 there is shown an alternate construction of an actuator in accordance with the present invention, the actuator 50 shown therein comprising a cylinder 51 which is provided with end caps 52 and 53, these end caps being annular and each having a central opening therethrough. In the internal wall of the end caps 52 and 53 there are internal grooves 54 and 55 in which may be seen O-rings 19 having inserts 21 and 22 on either side thereof.

Within the cylinder 51 is a piston generally designated 60 and comprising a piston body 61 having a pair of annular shoulders 62 and 63, defining therebetween an external groove containing an O-ring 19 and anti-extrusion rings 21 and 22. The O-ring 19 between the shoulders 62 and 63 is compressed, as will be seen, by the cylinder 51. Appropriate bores 64 and 65, which are parallel in the illustrative embodiment of FIGURE 3, receive pivot pins 66 and 67, respectively, these pins and bores extending transversely of the longitudinal axis of piston body 61. Journaled on the pivot pins 66 and 67 are thrust links 68 and 69, respectively, these thrust links extending through and within hollow piston rods 71 and 72, which latter extend oppositely from the piston body 61, and may be integral therewith. The hollow piston rods 71 and 72 extend through the end caps 52 and 53 and are in sealing engagement with the O-rings 19 in these end caps.

The pivot pins 66 and 67 are retained in position in the piston body 61 by a pair of tubular retainer sleeves 73 and 74, and suitable hydraulic fluid lines 76 and 77 are connected with the interior of the cylinder 51. Appropriate exhaust lines 78 and 79 may also be provided. It will be appreciated that, because actuator 50 is adapted to be fixedly mounted, fluid lines 76–79 can be rigid tubes rather than flexible hoses.

The thrust links 68 and 69 are connected to respective crank arms 81 and 82 of devices (not shown) to be driven by the hydraulic actuator 50, the connection being accomplished by pivot pins 83 and 84, these pins describing an arc when the crank arms are moved.

In operation, the admission of hydraulic fluid through either the line 76 or the line 77 will cause the piston assembly 60 to move to the right or left, as the case may be, to thereby rotate the crank arms 81 through the agency of the thrust links 68 and 69, these latter being free to pivot on the pivot pins 66 and 67 and being of smaller diameter than the internal diameter of the hollow thrust rods 71 and 72. The various O-rings 19 with their adjacent anti-extrusion rings 21 and 22 will perform in the manner described hereinabove.

In FIGURE 4 there is shown a hydraulic actuator generally designated 90 and comprising a body 91 having a through bore provided with a cylinder liner 92 and annular end caps 93 and 94, which may be screw-threaded thereto. The end caps 93 and 94 are provided with grooves, O-rings and back-up, or anti-extrusion rings, in the same manner as the end caps 52 and 53 of actuator 50. Within the cylinder liner 92 there are a pair of pistons 95 and 96 each comprising a piston head 97, 98 and each having an outwardly extending hollow piston rod 99, 101. The piston rods 99 and 101 pass through the end caps 93 and 94 and are in sealing engagement with the O-rings therein.

A bearing member 102 having a spherical seat 103 is seated in an internal counterbore 104 in the piston 95. A similar bearing 106 having a spherical seat 107 is provided in the piston 96, and is seated against an internal tube 108 which is screw-threaded into the hollow piston rod 101. By selective adjustment of tube 108 all undesirable clearance can be eliminated from the ball joint assembly 102, 106, 113, 114, 117. This obviates the need for impossibly small tolerances otherwise necessary to achieve substantially zero back-lash.

A pair of thrust links 111, 112 extend through the hollow piston rods 99 and 101, respectively, and each has a spherical outer bearing portion 113, 114 in engagement with the spherical seats 103, 107, respectively, whereby the thrust links 111 and 112 may rotate relatively to the pistons 95 and 96. Thrust links 111 and 112 have in the spherical bearing portions 113, 114 thereof, spherical seats 115, 116, and in engagement with these latter seats is a sphere 117. As will be understood, the sphere 117, the seats 115 and 116, and the seats 103 and 107 all have a common center of curvature.

The exterior diameters of the thrust links 111 and 112 are less than the internal diameters of the hollow piston rods 99 and 101, and the thrust links 111 and 112 may thereby move within these hollow piston rods to cause arcuate movements of appropriate linkage to which the outer ends of the thrust links 111 and 112 are connected.

A connecting member 118 extending between the piston rod 101 and a position transducer 119 causes the latter to function in known manner to indicate the position of the members driven by the thrust links 111 and 112.

Although the end caps 93 and 94 are each provided with the O-ring and double anti-extrusion ring construction which are the same as those provided in the end caps of actuator 50, in each of the piston heads 97 and 98 there is a groove in which is an O-ring 120 with a single anti-extrusion ring 121, the single anti-extrusion ring 121 being on the side of the groove in which it is located, relatively to O-ring 120, which is opposite to that which receives the pressure, and as will be clear from FIGURE 4, the O-ring 120 is closer to the pressure chamber which is to the left thereof than is the back-up ring 121.

Upon an increase in pressure on either side of the piston 95 or the piston 96, the entire dual-piston construction will be caused to move towards the right or towards the left, to thereby move the actuated devices through a rotational movement, this movement being effected by the thrust links 111 and 112 which not only move longitudinally, but also have a rotational angular motion about the center of sphere 117. The O-rings, with the anti-extrusion rings associated therewith, will function in the manner hereinabove described to provide for an improved response of the hydraulic actuator 90.

The back-up rings or anti-extrusion rings 121, reduce the tendency of the outer portion of the O-ring to be pressed or extruded into the annular area between the inner surface of the cylinder, and the piston 95, 96. This provides a more positive seal between the O-ring and the cylinder, as it reduces the tendency of the hydraulic fluid to be blown through narrow gaps or crevices, formed in the thin extruded section of the O-ring.

In the construction shown in FIGURE 4, the right-hand thrust link 112 is fixed in length, the left-hand thrust link 111 being adjustable in length.

The adjustable thrust link has an externally threaded rod end 123, fitted thereto, the rod end being threadably fitted to the interior of the cylindrical section 124 of the thrust link 111. A lock nut 125, is provided at the end of the tubular section 124, to positively locate the rod end 123 relative to the tubular section 124 of the adjustable thrust link.

FIGURE 5 shows a modification of the piston and piston rod construction shown in FIGURE 4.

In this construction, a single cylindrical piston 127 having a pair of hollow tubular piston rods 128, 128a integral therewith and extending outward beyond opposite ends of the piston, are employed, the piston rods being coaxial with the piston 127.

In insert 129, having a spherical segmental seat 130 therein, is seated in a cylindrical counterbore 131 through the piston rod. A similar insert 132 is fitted to the counterbore 131, at the opposite side of the pivot axis, the insert having a spherical segmental seat 133 therein, similar to that in the insert 129.

A pair of thrust links 134, 135 similar to those shown in FIGURE 4, is mounted on opposite sides of the pivot axis, each of the thrust links having a spherical segmental shoe 136, 137 integral therewith. A spherical segmental bearing 139, 140 is formed at the outer surface of each of the shoes 136, 137, each bearing 139, 140 being seated in the mating seat 130, 133 in the adjoining insert 129, 132.

The inner surface of each of the shoes 136, 137, has a spherical segmental seat 141, 142 therein, the seat being in engagement with a central sphere 117 which is similar to that shown in FIGURE 4.

The right-hand insert shown in FIGURE 5, is located by a tubular spacer 143 fitted to the inner diameter of the right-hand piston rod 128a, a tubular nut 144 threadably fitted to the piston rod 128a being provided to force the tubular spacer 143 against the insert. As explained with respect to the FIGURE 4 embodiment, all undesirable clearance can be eliminated from the ball joint assembly by appropriate adjustment of nut 144.

The piston has a pair of annular grooves 145, 146 therein, an O-ring 120 being fitted to each of the grooves, each O-ring having a single anti-extrusion ring 150, 151 located adjacent one side thereof, the anti-extrusion rings functioning in substantially the same manner as those shown in FIGURE 4 and hereinbefore described.

Where an anti-extrusion ring 150, 151 is used with each O-ring, there is a tendency for the O-ring to be forced into a position against the wall of the groove opposite the anti-extrusion ring.

This tends to reduce to a minimum, the dead zone of the actuator shaft, or the area in which the piston is moved, while the O-rings remain stationary, thereby reducing the effective movement of the piston 127 relative to the cylinder.

FIGURES 6 and 7, show modifications of the O-ring arrangement shown in FIGURE 5.

In the construction shown in FIGURE 6, a single groove 160 is cut around the outer circumference of the piston in place of the two parallel grooves. A single O-ring 120 having a pair of Teflon anti-extrusion rings 150, 151 fitted to both sides thereof, is inserted in the groove 160.

The tubular piston rods 152, 153 located at opposite ends of the piston 148a are essentially the same as those shown in FIGURE 7.

Fluid under high pressure, similar to that shown in FIGURE 7 is fed to the right-hand area 157 adjacent the piston 148a. Similarly, fluid at a lower pressure, similar to that shown in FIGURE 7, is fed to the area 158 at the left-hand side of the piston 148a.

Under normal conditions with fluid pressure against both anti-extrusion rings 150, 151, the anti-extrusion rings, 150, 151 would be forced against the O-ring, thereby longitudinally compressing the O-ring, and expanding the outside diameter thereof.

This maintains a positive seal between the interior of the cylinder and the piston 148a.

To that extent, the operation is substantially the same as that shown in FIGURE 7 and hereinafter described.

In this construction the cylindrical piston 148, has a pair of grooves 149, 149a therein, an O-ring 120, 120a being fitted to each of the grooves, a Teflon or othe type of plastic anti-extrusion ring 150, 151 is fitted to each of the grooves adjacent one face of the O-ring.

In this construction, the tubular piston rods 152, 153, located at opposite sides of the piston 148 are substantially the same as those shown in FIGURES 4 and 5, the piston rods functioning in substantially the same manner.

A substantially circular vent opening 155 is cut through the piston 148 in a direction substantially perpendicular to the longitudinal axis of the piston, the opening being connected to a longitudinal passage 156, through the piston rod, which is vented to the atmosphere.

In the construction shown in FIGURE 7, fluid under hydraulic line pressure of the order of 2,000 lbs. per sq. inch to the area 157, at the right-hand side of the piston 148, fluid at a considerably lower pressure being available in the area 158, at the left-hand side of the piston 148.

Under normal conditions, an O-ring has a width tolerance of the order of .003. With the construction shown in FIGURE 7, the high pressure fluid at the right-hand side of the cylinder forces the Teflon anti-extrusion rings toward the opposite face of the groove thereby compressing the O-ring 120a, and sealing the area in the cylinder 92.

Similarly the fluid in the low pressure area forces the anti-extrusion ring 150 toward the O-ring, thereby compressing the O-ring and sealing the area within the cylinder.

Due to the vent opening 155 at the center of the piston, which is connected to the atmosphere, the pressure in the area between the O-rings 120, 120a is reduced to atmospheric pressure at all times, thereby maintaining high pressure differentials between the cylinder areas 157, 158 at both sides of the piston and the area between the O-rings 120, 120a.

This forces the O-rings toward the center of the piston, and maintains a constant fluid seal at all times.

The combination of the two O-rings, the anti-extrusion rings 150, 151, used with each O-ring, and the vent between the O-rings reduce the dead space in the position to a minimum, thereby providing more positive synchronization between the valve operation, and the movement of the actuator piston 148.

The back-up or anti-extrusion rings 150, 151 reduce the tendency of the outer portion of the O-ring to be pressed or extruded into the annular area between the inner surface of the cylinder, and the piston. This provides a more positive seal between the O-ring and the cylinder, as it reduces to a minimum, the tendency of the hydraulic fluid to be blown through the narrow crevices formed in the thin extruded section of the O-ring.

With this construction the pressure of the hydraulic fluid in the two areas 157, 158, against the outer surfaces of the anti-extrusion rings 150, 151, force the O-rings 120, 120a against the walls of the grooves, opposite the anti-extrusion rings 150, 151.

The air vent 155 at the center, between the O-rings 120, 120a, reduces the air pressure built up by the movement of the O-rings, thereby allowing the O-rings to be moved to the walls of the grooves 149, 149a.

With the O-rings in this position, they tend to follow accurately the movement of the piston of the actuator, relative to the cylinder wall.

This tends to reduce to a minimum the dead zone of the actuator shaft, or the area, in which the piston is moved, while the O-rings remain substantially stationary, thereby reducing the effective movement of the piston relative to the cylinder.

In this manner, more accurate coordination is obtained between the piston and the hydraulic pressure, as provided by the valve. This provides more positive coordination, and synchronization, between the valve movement and the movement of the actuator piston and shaft combination.

In aircraft, or missile applications, this is of vital importance, as relatively small movements of the plunger of the valve can accurately be coordinated, thereby providing accurate syncronization between the valve and the actuator.

There have been provided actuators in which the actuator itself is rigidly mounted and in which the actuator drives a suitable device in a rotational or arcuate movement, thus eliminating the necessity for hydraulic lines of a flexible nature, and also eliminating side forces on the bearings. There has also been provided a sealing member construction comprising an O-ring and one or more anti-extrusion rings which reduces the tendency of the O-ring heretofore used to have a longitudinal movement, and thus provides for greatly improved response of the hydraulic actuator. The improved O-ring and anti-extrusion ring construction may be used as a seal for a male member and a female member in cooperative engagement, as well as for a seal of a piston relative to a cylinder in a hydraulic actuator.

It will be obvious to those skilled in the art that various changes may be made without departing from the spirit of the invention and therefore the invention is not limited to what is shown in the drawings and described in the specification but only as indicated in the appended claims.

What is claimed is:
1. A hydraulic actuator comprising:
   a fixedly-mounted cylinder;
   a hollow double-acting piston disposed in said cylinder for longitudinal displacement relative thereto, said piston including a cylindrical body portion having oppositely-extending coaxial tubular piston rods of substantially smaller diameter;
   an annular internal shoulder in said piston proximate the juncture of said body portion and one of said tubular piston rods;
   a first annular bearing member in said piston having one face seated against said shoulder and, on the other face, a concentric internal spherical bearing surface;
   first and second thrust links extending respectively through said one and the other of said piston rods terminating, at their inner ends, in confronting cup-shaped portions each having inner and outer spherical bearing surfaces, the inner surfaces coacting to define a spherical bearing socket;
   a bearing sphere disposed within said socket;
   a second annular bearing member in said piston displaced longitudinally from said one annular bearing member in the direction said other piston rod and having on its inner face a concentric internal spherical bearing surface, the bearing surfaces of said first and second bearing members being complementary to, and adapted for bearing engagement with, the outer spherical bearing surfaces of the respective cup-shaped portions of said thrust links;
   and means for adjustably establishing and maintaining a predetermined longitudinal spacing between said first and second annular bearing members whereby the bearing surfaces of the annular bearing members engage the outer bearing surfaces of the cup-shaped thrust-link portions and the inner bearing surfaces of the cup-shaped portions engage said sphere, all of said spherical bearing surfaces thus engaged having substantially a common center of curvature at the center of said sphere.
2. A hydraulic actuator according to claim 1, wherein said means includes a cylindrical sleeve coaxially threaded into said other piston rod so that its inner end clamps said annular bearing members, cup-shaped thrust link portions and sphere against said annular shoulder.

References Cited by the Examiner

UNITED STATES PATENTS

| 1,491,797 | 4/24 | Harrison | 92—113 |
| 1,591,343 | 7/26 | Redfield | 309—19 |
| 1,787,638 | 1/31 | Moore | 92—187 |
| 2,089,491 | 8/37 | Kuiper | 92—113 |
| 2,762,585 | 9/56 | Eaton et al. | 309—20 |
| 2,797,971 | 7/57 | Greenough | 309—23 |
| 2,809,080 | 10/57 | Mittell et al. | 309—23 |
| 2,914,368 | 11/59 | Farmer et al. | 92—253 |
| 2,932,281 | 4/60 | Moskowitz | 121—38 |
| 2,946,316 | 7/60 | Bruehl | 121—38 |
| 2,973,978 | 3/61 | Oppenheim | 277—188 |

FOREIGN PATENTS 863,093  12/40  France.

FRED E. ENGELTHALER, *Primary Examiner.*

KARL J. ALBRECHT, *Examiner.*